3,152,173
BASICALLY SUBSTITUTED DIPHENYL-METHANE DERIVATIVES AND PROCESS FOR PREPARING THEM
Gustav Ehrhart, Bad Soden, Taunus, Heinrich Ott, Eppstein, Taunus, and Ernst Lindner, Frankfurt am Main, Germany, assignors to Farbwerke Hoechst Aktiengesellschaft vormals Meister Lucius & Brüning, Frankfurt am Main, Germany, a corporation of Germany
No Drawing. Filed May 5, 1959, Ser. No. 811,011
Claims priority, application Germany, May 7, 1958, F 25,702
10 Claims. (Cl. 260—501)

Diphenyl-methane derivatives containing a basic, aliphatic or heterocyclic radical are known, for instance, as spasmolytics from German Patent 766,207.

Now we have found that diphenyl-methane derivatives containing a basic araliphatic substituent show a good cardiac and circulatory action. The present invention relates to the preparation of such compounds of the formula

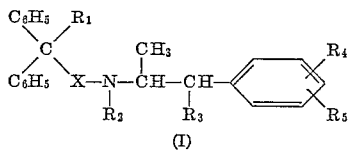

(I)

wherein X is a straight-chain or branched aliphatic hydrocarbon (alkylene) of at most three carbon atoms, $R_1$ is hydrogen or low molecular weight alkyl, $R_2$ is hydrogen or methyl, $R_3$ is hydrogen or hydroxy, $R_4$ and $R_5$ are hydrogen, hydroxy, or low molecular weight alkoxy, and to the preparation of their addition salts of pharmaceutically acceptable acids according to methods which can generally be applied for the preparation of such diphenyl-methane derivatives.

The compounds can be prepared by reducing amines of the general formula

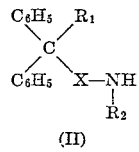

(II)

wherein $R_1$, $R_2$ and X have the meaning given above, in the presence of ketones corresponding to the general formula

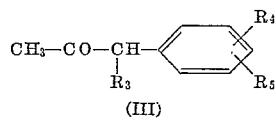

(III)

wherein $R_3$, $R_4$ and $R_5$ have the meaning given above, or by reacting the amines of the formula indicated above, preferably in the presence of agents splitting off hydrogen halide, with halogen-substituted ketones of the general formula

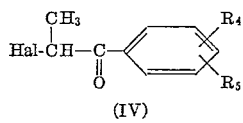

(IV)

wherein $R_4$ and $R_5$ have the meaning given above, and by reducing in the condensation products obtained, the keto-group in usual manner into the hydroxy group. The amines of the above-mentioned formula can likewise be reduced, if desired gradually, in the presence of diketones of the general formula

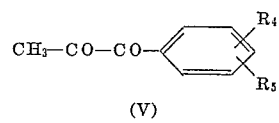

(V)

in which $R_4$ and $R_5$ have the meaning given above. A further possibility for the preparation of the desired diphenyl-methane derivatives consists in reducing aldehydes or ketones corresponding to the general formula

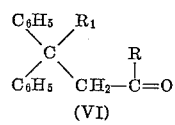

(VI)

in which R stands for hydrogen or the methyl group and $R_1$ has the meaning given above in the presence of amines corresponding to the general formula

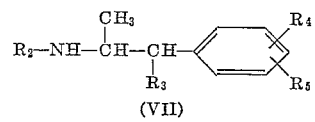

(VII)

in which $R_2$, $R_3$, $R_4$ and $R_5$ have the meanings given above. Furthermore, it is possible to react diphenyl-methane or diphenyl-acetonitrile, preferably in the presence of agents splitting off hydrogen halide with halogen-substituted amines of the general formula

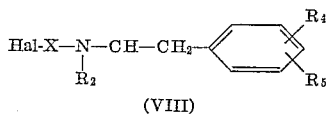

(VIII)

in which $R_2$, $R_4$, $R_5$ and X have the meanings given above; when using diphenyl-acetonitrile the nitrile group in the reaction products obtained is replaced in the usual manner by hydrogen. Diphenyl-methane derivatives of the general formula mentioned above (I) which are substituted at the nitrogen atom by a methyl group, can be obtained from the corresponding compounds—in which $R_2$ stands for hydrogen—by applying the usual methylation methods, particularly the reaction with aqueous formaldehyde in the presence of formic acid. Finally such compounds of the general formula indicated above—wherein $R_4$ and/or $R_5$ stand for hydroxy groups—can be obtained by demethylating in the corresponding compounds—in which $R_4$ and $R_5$ stand for methoxy groups—these groups preferably by heating with hydrogen bromide or with aluminum chloride or with pyridine-hydrochloride. In the same manner compounds of the general formula indicated above—in which $R_4$ and/or $R_5$ stand for alkoxy groups—are obtained from the corresponding hydroxy-compounds ($R_4$ and/or $R_5$ stand for the hydroxy groups) by alkylation which is carried out in the usual manner.

It is of special advantage for the preparation of the products of the present invention to reduce ketones according to Formula III in the presence of amines corresponding to Formula II. As amines there can be used for example:

1,1-diphenyl-propylamine-(3),
1,1-diphenyl-ethylamine-(2),
2,2-diphenyl-butylamine-(1),
2,2-diphenyl-propylamine-(1),
2,2-diphenyl-amylamine-(1),
2,2-diphenyl-hexylamine-(1),
1,1-diphenyl-3-methyl-propylamine-(3),
N-methyl-1,1-diphenyl-propyl-amine-(3),
N-methyl-1,1-diphenylethylamine-(2),
N-methyl-2,2-diphenyl-butylamine-(1),
N-methyl-2,2-diphenyl-propylamine-(1),
N-methyl-2,2-diphenyl-amylamine-(1),
N-methyl-2,2-diphenyl-hexylamine-(1) and
N-methyl-1,1-diphenyl-3-methyl-propylamine-(3).

As ketones there can be used for instance, phenylacetone,
(3,4-hydroxy- or dimethoxy-phenyl)-acetone,
(2-hydroxy- or methoxy-phenyl)-acetone,
(3-hydroxy- or methoxy-phenyl)-acetone,
(4-hydroxy- or methoxy-phenyl)-acetone,
α-phenyl-α-hydroxy-acetone,
α-(3,4-hydroxy- or dimethoxy-phenyl)-α-hydroxy-acetone,
α-(2-hydroxy- or methoxy-phenyl)-α-hydroxy-acetone,
α-(3-hydroxy- or methoxy-phenyl)-α-hydroxy-acetone and
α-(4-hydroxy- or methoxy-phenyl)-α-hydroxy-acetone.

The reduction in the presence of the ketones is preferably carried out by catalytic hydrogenation, for instance with metals of the eighth group of the Periodic System, preferably with nickel catalysts, in the presence of solvents generally used for this purpose, for instance aqueous alcohols, alcohols or water. Precious metals or Raney-catalysts may likewise be used. It is likewise possible to carry out the reduction by means of nascent hydrogen, e.g. with aluminum amalgam and alcohol, sodium amalgam, lithium-aluminum-hydride or sodium boron-hydride, or electrolytically.

It is likewise possible to react the afore-mentioned amines corresponding to Formula II with halogen substituted ketones of the Formula IV. As halogen ketones there may be mentioned:

α-bromoethyl-phenyl-ketone,
α-chloroethyl-phenyl-ketone,
α-bromethyl-(3-methoxy-phenyl)-ketone,
α-bromethyl-(4-methoxy-phenyl)-ketone,
α-chlorethyl-(3,4-dimethoxy-phenyl)-ketone,
α-bromethyl-(3,4-dimethoxy-phenyl)-ethyl-ketone.

If desired, the reaction can be carried out in an appropriate solvent, such as ether, chloroform or aromatic hydrocarbons by means of prolonged heating. Two molecular proportions of the amine used are suitable applied in order to bind the hydrogen halide set free. The hydrogen halide can likewise be bound by the aid of the usual agents such as alkali metal carbonates, alkali metal hydroxides, alkaline earth metal carbonates and alkaline earth metal hydroxides, as well as by means of organic bases such as pyridine or quinoline which may simultaneously be used as solvents. The obtained reaction mixtures are worked up in usual manner by eliminating the hydrohalic acid salt of the base used, for instance by precipitation with ether or shaking with water. The products of the invention can be purified by distillation. The amino-ketones thus obtained are then reduced in usual manner to yield the corresponding amino alcohols. Likewise in this case the reduction of the keto-group, for instance catalytically by means of metals of the eighth group of the Periodic System, preferably nickel catalysts, can be carried out in the presence of the usual solvents, for instance aqueous alcohols, alcohols or water. Noble metals or Raney-catalysts can likewise be used. Furthermore, it is possible to reduce by means of nascent hydrogen, for example with aluminum amalgam and alcohol, sodium amalgam, lithium-aluminum-hydride or sodium boron-hydride. Finally, the reduction can be effected electrolytically.

Another possibility for preparing the desired compounds, starting from amines according to Formula II consists in subjecting these compounds to reduction in the presence of diketones corresponding to the general Formula V. As diketones there may be mentioned:

(1,2-dioxo-propyl)-benzene,
4-(1,2-dioxo-propyl)-anisol,
3-(1,2-dioxo-propyl)-anisol,
4-(1,2-dioxo-propyl)-phenol,
3-(1,2-dioxo-propyl)-phenol,
1-(1,2-dioxo-propyl)-3,4-dimethoxy-benzene and
1-(1,2-dioxo-propyl)-3,4-dihydroxy-benzene.

In this reaction the keto group adjacent to the methyl group preferably reacts with the amine; the other keto group can be reduced simultaneously or additionally in the manner already described.

Aonther form of execution of the process according to the invention comprises the reduction of aldehydes or ketones corresponding to the general Formula IV with amines according to Formula VII. As aldehydes or ketones there may be used, for instance:

1,1-diphenyl-propionaldehyde-(3),
2,2-diphenyl-butyraldehyde-(4),
1,1-diphenyl-ethyl-(2)-methyl-ketone.

Likewise in this case the reduction can be carried out in the manner described above.

Another favorable possibility of preparing the desired compounds provides reacting diphenyl-acetonitrile or diphenyl-methane with halogen-substituted amines of the Formula VIII. As halogen-substituted amines there may be mentioned:

1-phenyl-2-(chlorethyl-methylamino)-propane,
1-phenyl-2-(chlorethyl-benzyl-amino)-propane,
1 - (3,4 - dimethoxy-phenyl)-2-(chlorethyl-methylamino)-propane,
1 - (3,4 - dimethoxy-phenyl)-2-(chlorethyl-benzylamino)-propane,
1-phenyl-2-(chlormethyl-ethylamino)-propane,
1-phenyl-2-(chlormethyl-benzylamino)-propane,
1 - (4 - methoxy-phenyl)-2-(chlorethyl-benzylamino)-propane,
1 - (2 - methoxy-phenyl)-2-(chlorethyl-benzylamino)-propane,
1 - (3 - methoxy-phenyl)-2-(chlorethyl-methylamino)-propane.

This reaction can, in principle, be carried out analogously to the method described in Liebigs Annalen der Chemie 561, page 52 (1948). It is preferable to operate in inert organic solvents such as benzene, toluene, xylene. As agents splitting off hydrogen halide there may be mentioned for example: sodium amide, sodium phenyl, lithium phenyl and metallic sodium. Two of the three reaction components needed (diphenyl-acetonitrile, agent splitting off halogen and halogen substituted amine) are favorably dissolved or suspended and the third component is added in several portions. When the addition is terminated the mixture is suitably boiled for some time under reflux and upon addition of water the reaction mixture is worked up in the usual manner, for instance by extracting the basic parts from the organic solvent by means of dilute acids. When diphenyl-methane is used as starting substance phenyl-sodium is advantageously used.

The nitrile group contained in the products obtained according to the process of the invention if diphenyl-acetonitrile is used as starting substance can be converted in a hydrogen atom according to a known method (cf. Liebigs Annalen der Chemie 561, page 52 (1948) by prolonged heating with sodium amide, benzene or toluene. The nitrile group can likewise be hydrolyzed with strong acids, for instance sulfuric acid of 70% strength in order to obtain the carboxyl group and the latter can be decarboxylated by heating. The benzyl group which may be present at the nitrogen atom can be split off in the usual manner, for instance by catalytic hydrogenation, in the presence of a precious metal catalyst.

In cases in which in the general formula of the preparation methods mentioned for the products obtained according to the invention $R_2$ stands for hydrogen, the NH-compound can be methylated in the usual manner. For instance, the methylation can be carried out in the presence of aqueous formaldehyde with palladium as catalyst in solvents usual for hydrogenations. The methylation can likewise be carried out in known manner by means of aqueous formaldehyde in the presence of formic acid by heating the reaction mixture for a prolonged time on the steam bath.

The products of the invention corresponding to the general Formula I—in which $R_4$ and/or $R_5$ stand for a hydroxy group—can be prepared in such a manner that corresponding compounds in which $R_4$ and/or $R_5$ stand for methoxy groups—are demethylated in the usual manner. This can be done by heating with hydrogen bromide or with aluminum chloride of with pyridine-hydrochloride.

The products of the invention corresponding to general Formula I, in which $R_4$ and/or $R_5$ stand for alkoxy groups, can likewise be prepared by alkylation of the compounds containing hydroxy-groups in corresponding position. To this end the hydroxy compounds can, for instance, be reacted with dimethyl-sulfate, diethyl-sulfate, methyl-iodide, ethyl-iodide and with other alkylation agents, if necessary in the presence of bases such as alkali metal hydroxides or alkaline earth metal hydroxides. The reaction with dialkyl-sulfates generally occurs already at room temperature; the alkylation by means of alkyl-halides can be achieved by heating, if necessary in the autoclave.

As basic compounds the products of the invention can be converted by means of inorganic or organic acids into the corresponding salts. As inorganic acids there enter into consideration, for instance: hydrohalic acids such as hydrochloric acid and hydrobromic acid, furthermore sulfuric acid, phosphoric acid and amidosulfonic acid. As organic acids may be mentioned, for example: formic acid, acetic acid, propionic acid, lactic acid, maleic acid, succinic acid, tartaric acid, benzoic acid, salicyclic acid, citric acid, aceturic aid, hydroxyethanesulfonic acid and ethylene-diamine-tetracetic acid. The products of the invention can likewise be converted by means of alkyl-halides inot the corresponding quaternary salts, if the basic residue contains a tertiary nitrogen atom.

The products of the invention exhibit an extraordinary favorable cardiac and circulatory effect. For instance, administration of 2 - (1',1'-diphenyl-propyl-5'-amino)-3-phenyl-propane in rabbits' hearts, prepared according to Langendorff, at a rate of flow of 20 micrograms per minute causes a strong dilatation of coronary vessels which reaches a maximum with 30 micrograms/minute. Also when the infusion is discontinued, the increase of flow is still maintained for a prolonged time. Furthermore, the frequency of the heart is reduced, which influences the animal's whole organism. The same compound when administered in small doses provokes a distinct dilatation likewise in the rabbit's ear isolated and perfused according to Kraskow-Pissemski. 5 micrograms cause a weak 150 micrograms a very strong dilatation of the vessels.

The products of the invention cause a dilatation of the coronary and peripheral vessels already when given in such small dose that the toxicity (for example as regards 2 - (1',1' - diphenyl-propyl-3'-amino)-3-phenyl-propane, the lethal dose amounts to 15- 20 milligrams/kilograms) is practically negligible.

Likewise when applied in clinical examinations the compound mentioned above shows a dilatory effect on the vessels, particularly on the coronary vessels. It likewise causes an increased peripheral blood circulation. The dilatation of the coronary vessels sets in very rapidly and, compared with the known nitro compounds, for instance the tetra-nitric acid ester of erythrol is maintained for a long time (several hours). As single dosis there are administered 5–10 milligrams.

The products of the invention can be administered as such or in the form of corresponding salts, or also in admixture with pharmaceutically usual carriers, either parenterally or orally. In case of oral administration they may be given in the form of tablets or dragees into which the products of the invention are made up as active substance together with the usual carriers such as lactose, starch, tragacanth and magnesium stearate.

The following examples serve to illustrate the invention but they are not intended to limit it thereto.

*Example 1*

21.1 grams of 1,1-diphenyl-propylamine-(3)- are hydrogeneated by means of palladium with 15 grams of acetylphenyl-carbinol in 200 cc. of isopropanol. The calculated amount of hydrogen is taken up at room temperature. The separated oily base is dissolved by heating with alcohol. After filtration water is added until turbidity sets in. 24.5 grams of 2-(1',1'-diphenyl-propyl-3' - amino)-3-hydroxy-3-phenyl-propane are obtained, melting at 108° C. By addition of the equivalent amount of aminosulfonic acid in water, filtration and concentration 28 grams of the aminosulfonic acid salt are obtained.

*Example 2*

Analogously to the direction given in example 1 there are obtained from 10.6 grams of 1,1-diphenyl-propylamine-(3) and 6.7 grams of phenyl-acetone by hydrogenation in methanol and by means of palladium at 50° C. grams of 2 - (1',1' - diphenyl-propyl - 3' - amino)-3-phenyl-propane boiling point at 195–198° C. under a pressure of 0.5 mm. of mercury, which after prolonged standing crystallize out. Melting point about 38–40° C. Hydrochloride (prepared in usual manner): melting point 188–190° C. Glycolic acid salt: melting point 140–142° C.

*Example 3*

10 grams of the base obtained according to Example 2 are shaken with 3 grams of aqueous formaldehyde of 40% strength and 150 cc. of methanol in the presence of palladium and hydrogen. After the calculated amount of hydrogen has been taken up, the whole is filtered and concentrated. The oily residue is heated with 2.5 grams of glycolic acid and 50 cc. of water. The solution is filtered and concentrated. The oily residue crystallizes after some time. There are obtained 8 grams of 2-(1',1'-diphenyl - propyl-3'-N-methylamino)-3-phenyl-propane-glycolate which melts at 84–86° C.

*Example 4*

10.6 grams of 1,1-diphenyl-propylamine-(3) and 9.7 grams of 3,4-dimethoxy-phenyl-acetone are hydrogenated at 50° C. analogously to the directions given in Example 1. The oily residue of the hydrogenation is heated with 3.8 grams of glycolic acid and 50 cc. of water. After filtration and cooling there are obtained 14.4 grams of 2-(1',1'-diphenyl-propyl-3'-amino)-3-(3'',4''-dimethoxy-phenyl)-propane-glycolate which melts at 146–147° C.

*Example 5*

10.55 grams of 1.1-diphenyl-propylamine-(3) are hydrogenated according to Example 1 at 70° C. with 8.3 grams of (m-hydroxy-phenyl)-acetyl-carbinol. The oily residue of the hydrogenation is diluted with normal hydrochloric acid. The oily hydrochloride solidifies on prolonged standing. After recrystallization from alcohol/ether there are obtained 14.5 grams of 2-[1',1'-diphenyl - propyl - 3' - amino]-3-hydroxy-3-(m-hydroxyphenyl)-propane-hydrochloride which melts at 206–208° C.

*Example 6*

10.6 grams of 1,1-diphenyl-propylamine-(3) are hydrogenated at 65–70° C. according to Example 1 with 8.2 grams of para-methoxy-phenyl-acetone. The hydrochloride obtained according to Example 5 is boiled for two hours under reflux with 60 cc. of aqueous hydrobromic acid of 48% strength. The deposited red oily layer solidifies on cooling. After shaking with sodium hydroxide solution and ether it is separated. Carbonic acid is introduced into the aqueous-alkaline solution until a pH-value of 8 is obtained. The oily base soon solidifies. After recrystallization from ethyl acetate there are obtained 8 grams of 2-[1',1'-diphenyl-propyl-3'-amino]-3-para-hydroxy-phenyl-propane which melts at 144–145° C.

*Example 7*

Upon hydrogenation according to Example 1 there are obtained from 11.25 grams of 2,2-diphenyl-butyl-(1)-amine and 6.7 grams of phenyl-acetone, 16.7 grams of oily 2-[2',2'-diphenyl-butyl-1'-amino]-3-phenyl-propane. Maleinate: melting point 135–137° C.; phosphate: melting point 187–188° C.

*Example 8*

21.2 grams of 1,1-diphenyl-propylamine-(3) and 13.4 grams of phenyl-acetone are dissolved in 200 cc. of alcohol; 230 cc. of water are added to the reaction mixture which is boiled for 6 hours under reflux in the presence of 15 grams of amalgamated aluminum. Upon filtration the filtrate is concentrated under reduced pressure and the residue is distilled. There are obtained 22 grams of 2-(1',1'-diphenyl-propyl-3'-amino)-3-phenyl-propane boiling at 180–190° C. under a pressure of 0.3 mm. of mercury; glycolic acid salts: melting point 141–142° C.

*Example 9*

10.6 grams of 1,1-diphenyl-propylamine-(3), 6.7 grams of phenyl-acetone and 50 cc. of benzene are heated for 30 minutes on the steam bath. After elimination of the solvent by distillation under reduced pressure 50 cc. of methanol and 3 cc. of water are added to the residue. By introduction in several portions of 1.2 grams of sodium boron hydride the temperature of the reaction mixture amounts to about 40° C. After some standing it is acidified by means of dilute hydrochloric acid and the methanol is distilled off under reduced pressure. There crystallize out 15.3 grams of 2-[1',1'-diphenyl-propyl-3'-amino]-3-phenyl-propane-hydrochloride melting at 190–192° C.

*Example 10*

22.4 grams of 1,1-diphenyl-ethyl-(2)-methyl-ketone are heated with 13.5 grams of 1-phenyl-2-aminopropane to 50–60° C. 200 cc. of isopropyl-alcohol are then added to the reaction mixture and the latter is hydrogenated in the presence of palladium at 120° C. under a pressure of 100 atmospheres. Upon filtration and concentration under reduced pressure the 2-[1',1'-diphenyl-butyl-3'-amino]-3-phenyl-propane boiling at 180–185° C. under a pressure of 0.3 mm. of mercury is obtained in the form of a colorless oil. After dissolution in double its amount of absolute alcohol the calculated amount of aminosulfonic acid is added and heated until dissolution sets in. After cooling and addition of ether the aminosulfonic acid salt of the above base is obtained. Melting point (after recrystallization from water) 147–148° C.

*Example 11*

A mixture of 23.5 grams of chlorobenzene and 33.6 grams of diphenyl-methane is added dropwise, while stirring, at 35° C., to 10.1 grams of finely cut sodium metal in 50 cc. of benzene. When the temperature is no more increased 42.3 grams of 2-(N-chlorethyl-N-methyl)-amino-3-phenyl-propane are dropwise added at 30–40° C. After boiling for 1 hour under reflux the mixture is cooled and water is cautiously added. The separated benzene layer is dried by means of sodium sulfate, the solvent is evaporated and the residue is fractionately distilled under reduced pressure. There is obtained the 2-[1',1'-diphenyl-propyl-3'-N-methyl-amino]-3-phenyl-propane which boils at 170–175° C. under a pressure of 0.08 mm. of mercury. The glycolic acid salt melts at 84–85° C.

*Example 12*

33 grams of 2-[N-1,1-diphenyl-1-cyano-propyl-(3)-N-methyl]-amino-3-phenyl-propane are dissolved in 150 cc. of benzene and the solution is boiled for 2 hours under reflux with 33 grams of sodium amide. After sucking off of the excessive sodium amide the benzene is distilled off under reduced pressure. The residue (28 grams) is distilled. There are obtained 20 grams of 2-[1',1'-diphenyl-propyl-3'-N-methyl-amino]-3-phenyl-propane in the form of a colorless oil which boils at 170–175° C. under a pressure of 0.08 mm. of mercury.

*Example 13*

10.6 grams of 1,1-diphenyl-propylamine-(3) with 7.4 grams of (1,2-dioxo-propyl)-benzene in 100 cc. of isopropanol in the presence of palladium black are shaken with hydrogen. 1/10 molecular proportion of hydrogen is taken up. The mass is worked up according to Example 1. There is obtained the 2-[1',1'-diphenyl-propyl-3'-amino]-3-hydroxy-3-phenyl-propane which melts at 109° C.

*Example 14*

5 cc. of bromine are dropwise added to 13.4 grams of propiophenone. When the evolution of hydrogen bromide is terminated 100 cc. of methylene chloride are added to the bromo-propriophenone which has been formed, and the mass is boiled for 1 hour under reflux with 42 grams of 1,1-diphenyl-propylamine-(3). A white crystal magma is formed. After filtering with suction the filtrate is concentrated under reduced pressure. The oily residue (40 grams) is dissolved in alcohol, transformed into the oxalate by means of the calculated amount of oxalic acid (20 g.). The oxalate (melting point about 200° C.) is decomposed by means of sodium carbonate solution and the free base is taken up in ether. Upon drying and distilling off of the ether there are obtained 20.8 grams of the amino-ketone in the form of oil. The oil is dissolved in 200 cc. of alcohol and shaken in the presence of palladium black at 60° C. with hydrogen. After taking up the calculated amount of hydrogen the catalyst is filtered off. 19 grams of 2-[1',1'-diphenyl-propyl-3'-amino]-3-hydroxy-3-phenyl-propane melting at 109–110° C. are obtained.

*Example 15*

17 grams of 2-[1',1'-diphenyl-propyl-3'-amino]-3-p-hydroxyphenyl-propane are shaken with 50 cc. of dilute sodium hydroxide solution and 6.3 grams of dimethyl-sulfate. When the reaction is finished the precipitated oil is separated and converted by means of dilute hydrochloric acid into the hydrochloride of 2-[1',1'-diphenyl-propyl - 3' - amino] - 3-p-methoxy-phenyl-propane-hydrochloride.

We claim:
1. Basically substituted diphenyl-methane derivatives of the formula

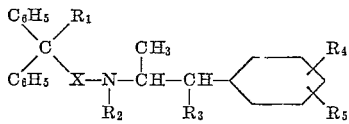

in which X is alkylene of from 1 to 3 carbon atoms, $R_1$ is a member selected from the group consisting of hydrogen and alkyl of at most four carbon atoms, $R_2$ is a member selected from the group consisting of hydrogen and methyl, $R_3$ is a member selected from the group consisting of hydrogen and hydroxy, $R_4$ and $R_5$ are members selected from the group consisting of hydrogen, hydroxy, and alkoxy of from 1 to 4 carbon atoms, and addition salts of pharmaceutically acceptable acids of these compounds.

2. Basically substituted diphenyl-methane derivatives of the formula

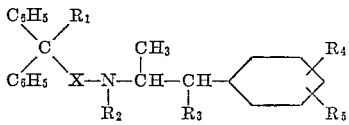

in which X is ethylene, $R_1$ is a member selected from a group consisting of hydrogen and alkyl of at most four carbon atoms, $R_2$ is a member selected from the group consisting of hydrogen and methyl, $R_3$ is a member selected from the group consisting of hydrogen and hydroxy, $R_4$ and $R_5$ are members selected from the group consisting of hydrogen, hydroxy, and alkoxy of from 1 to 4 carbon atoms, and addition salts of pharmaceutically acceptable acids of these compounds.

3. 2-[1',1'-diphenyl - propyl - 3' - amino] - 3 - phenyl-propane 4. 2-[1',1'-diphenyl-propyl - 3' - N - methylamino]-3-phenyl-propane 5. 2-[1',1' - diphenyl - propyl - 3' - N-methylamino]-3-phenyl-propane-glycolate 6. 2-[1',1'-diphenyl-propyl - 3' - amino] - 3-(3'',4''-dimethoxy-phenyl)-propane 7. 2-[1',1'-diphenyl-propyl-3' - amino] - 3 - (3'',4''-dimethoxy-phenyl)-propane-glycolate 8. 2-[1',1'-diphenyl-propyl - 3' - amino] - 3 - hydroxy-3-(m-hydroxy-phenyl)-propane 9. 2-[1',1'-diphenyl-propyl - 3' - amino] - 3 - hydroxy-3-(m-hydroxy-phenyl)-propane-hydrochloride 10. 2-[1',1'-diphenyl - propyl - 3' - amino] - 3 - (p-hydroxy-phenyl)-propane References Cited in the file of this patent
UNITED STATES PATENTS

| | | |
|---|---|---|
| 2,601,323 | Bradley et al. | June 24, 1952 |
| 2,681,934 | Hodge | June 22, 1954 |
| 2,738,347 | Bernstein et al. | Mar. 13, 1956 |
| 2,797,242 | Edgerton et al. | June 25, 1957 |
| 2,854,379 | Gancher | Sept. 30, 1958 |
| 2,872,374 | Beiler et al. | Feb. 3, 1959 |
| 2,894,033 | Janssen et al. | July 7, 1959 |

OTHER REFERENCES

Krohs et al.: German application, 1,058,063, printed May 27, 1959 (KL 12q 5), 3 pages spec.